O. EICK.
LABELING MACHINE.
APPLICATION FILED OCT. 30, 1912.

1,230,138.

Patented June 19, 1917.
11 SHEETS—SHEET 5.

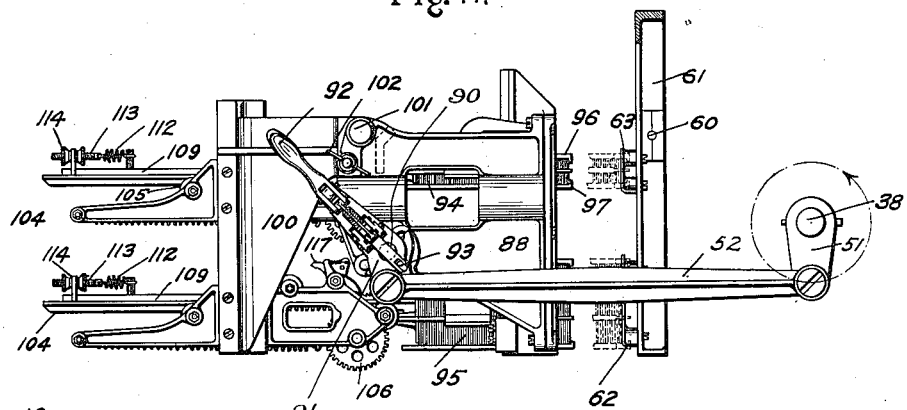
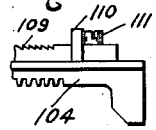
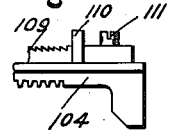
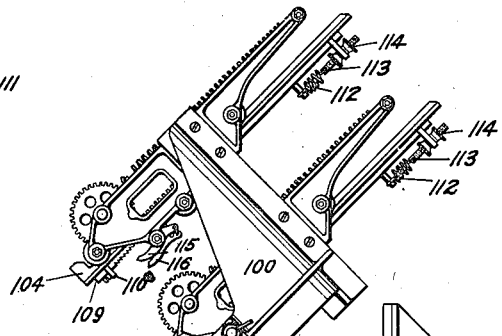
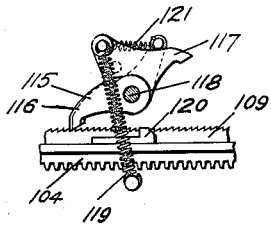
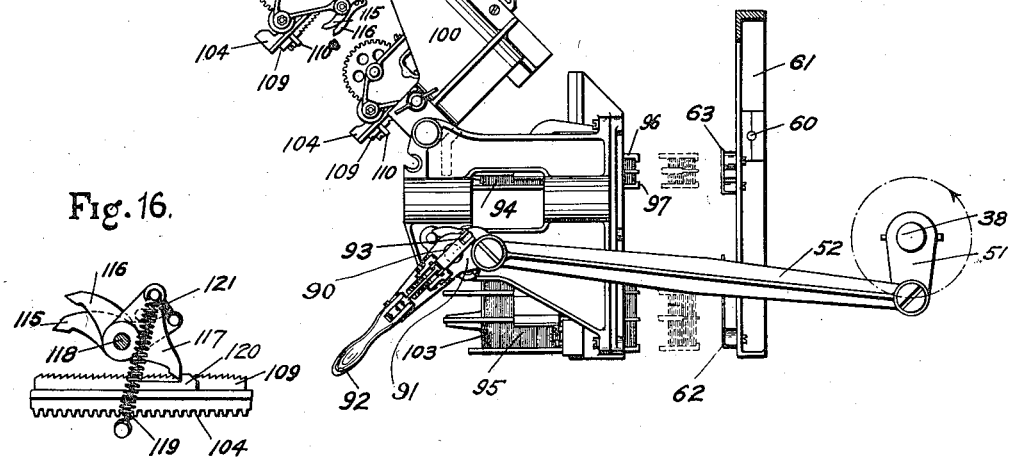

O. EICK.
LABELING MACHINE.
APPLICATION FILED OCT. 30, 1912.
1,230,138.
Patented June 19, 1917.
11 SHEETS—SHEET 10.
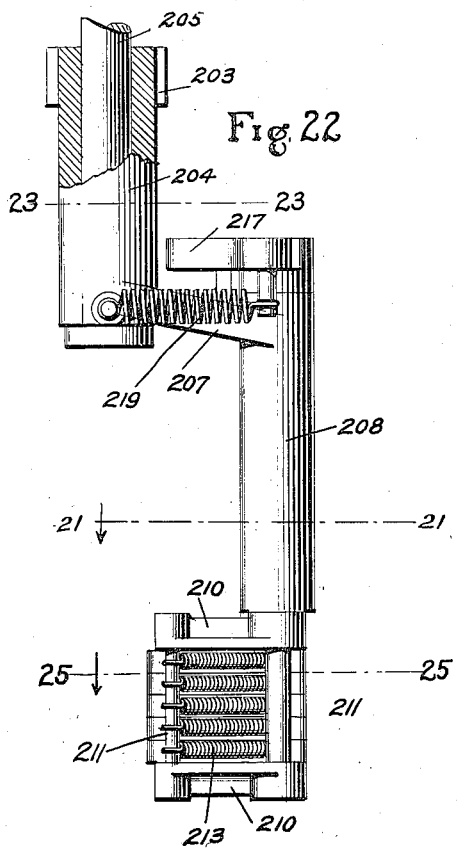
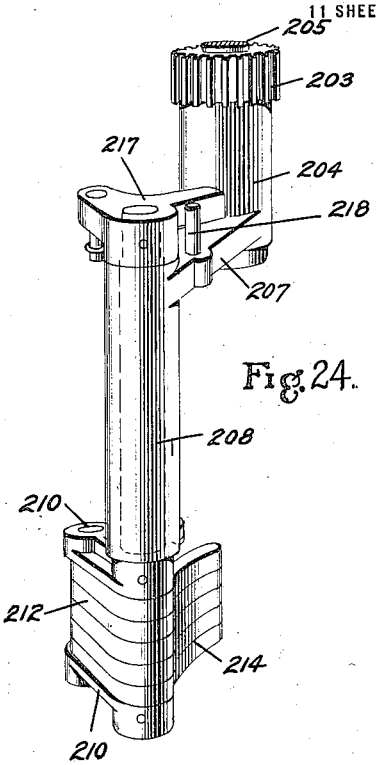
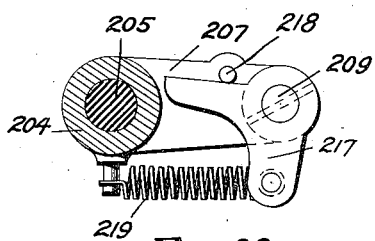
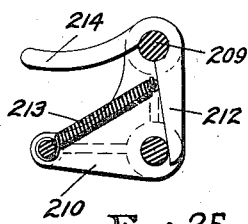

O. EICK.
LABELING MACHINE.
APPLICATION FILED OCT. 30, 1912.

1,230,138.

Patented June 19, 1917.
11 SHEETS—SHEET 11.

WITNESSES:

INVENTOR.
Otto Eick,
BY
ATTORNEY.

UNITED STATES PATENT OFFICE.

OTTO EICK, OF ST. LOUIS, MISSOURI.

LABELING-MACHINE.

1,230,138.  Specification of Letters Patent.  Patented June 19, 1917.

Application filed October 30, 1912. Serial No. 728,677.

*To all whom it may concern:*

Be it known that I, OTTO EICK, a citizen of the United States, residing at the city of St. Louis and State of Missouri, have invented certain new and useful Improvements in Labeling-Machines, of which the following is a specification.

This invention relates to labeling machines of the type which simultaneously applies neck and body labels to bottles.

A prominent characteristic of the machine is that the bottles pass through the machine in an upright position and move continuously past the various devices which successively apply, clamp and wipe down the label, so that the machine operates smoothly and at relatively high speed.

In order to economize in materials, facilitate the operation of the machine, and simplify the subsequent removal of the labels, these are glued only at opposite edges or ends.

Before proceeding to a detailed description of the machine I shall give a general statement of its principle of operation. The bottles are moved through the machine by a conveyer which preferably takes the form of a rotating table carrying a plurality of bottle clamps actuated by a fixed cam. An intake or feed device is provided to take individual bottles from the intake raceway, which may be supplied by any suitable conveyer, and insert them into successive bottle clamps on the rotating table. Rotating with the table are label holder arms, one for each bottle clamp, so mounted as to have a limited individual rotative movement relatively to the table, such relative movement being effected by a second fixed cam. This second cam is so designed that each label holder arm moves toward its corresponding bottle clamp, just as the bottle held thereby reaches the labels positioned for it by the label picker, so that the holder arm clamps the labels on the bottle and the continued movement of the bottle with the holder arm bearing against it strips the labels from the picker.

The pickers which are two in number, preferably take the form of inverted U-shaped frames sliding in vertical guides above the rotating table and moved intermittently upward and downward by a chain which is driven by a variable speed drive. This drive is so designed that each picker frame comes to rest alternately in its upper and lower positions and between these positions moves with a speed which gradually increases and decreases in order to avoid needless shock. Two picker frames are preferably used so that one is in the top position ready to receive labels from the label box while the other is at its lower position ready to deliver its labels to the bottle.

As above explained the labels are glued only at their ends so that the picker plates are located at the sides only of the picker frames. In the upward movement of the frames they are drawn across two glue feeding rollers which are in their upward path. When a picker frame reaches its upper position and comes to rest, the label feed mechanism moves toward this frame and presses the exposed neck and body labels into close contact with corresponding picker plates, so that upon the reverse movement of the label feeding device a neck and a body label are stripped off the supply in the label magazines and adhere to the picker plates. The succeeding downward movement of the picker frames carry these neck and body labels into position to be clamped on the bottles held by the bottle clamps on the rotating table. It should be noted that these bottles have a continuous motion, and that the picker frames are so designed as to permit the bottles to move between their downwardly extending arms in the act of stripping the labels from the pickers. The label holding arm remains in contact with the bottle as this continues on its course until after the neck and body labels have been wiped down into place, the former by a pair of swinging successively acting wiper arms and the latter by a pair of rubber wiper plates extending into the path of the body of the bottle. The reason for using two successively acting neck wipers is that the neck labels commonly have overlapping ends so that successive action is essential. The wiping action having brought the glued portions of the labels into contact with the bottles these are then discharged from the bottle holders upon a rotating discharge disk which feeds them to a suitable discharge mechanism.

I illustrate a successful embodiment of my invention in the accompanying drawings, in which:—

Fig. 11 is a side elevation on an enlarged scale showing the label feed mechanism in operative position;

Fig. 12 is a similar view showing the label feed mechanism thrown out with the spring follower mechanism locked and turned up to permit the insertion of a new supply of labels;

Figs. 13 and 14 are fragmentary views showing different positions of the label feed rack and the supplementary pressure ratchet;

Fig. 15 is a fragmentary view showing the supplementary pressure pawl in engagement and the lock-out pawl out of engagement;

Fig. 16 is a similar view showing the lock-out pawl in engagement and the supplementary pressure pawl out of engagement;

Fig. 22 is an elevation partly in section of a neck label wiper arm;

Fig. 23 is a section on line 23—23 of Fig. 22;

Fig. 24 is a perspective view of a wiper arm;

Fig. 25 is a section on line 25—25 of Fig. 22;

Figure 1:
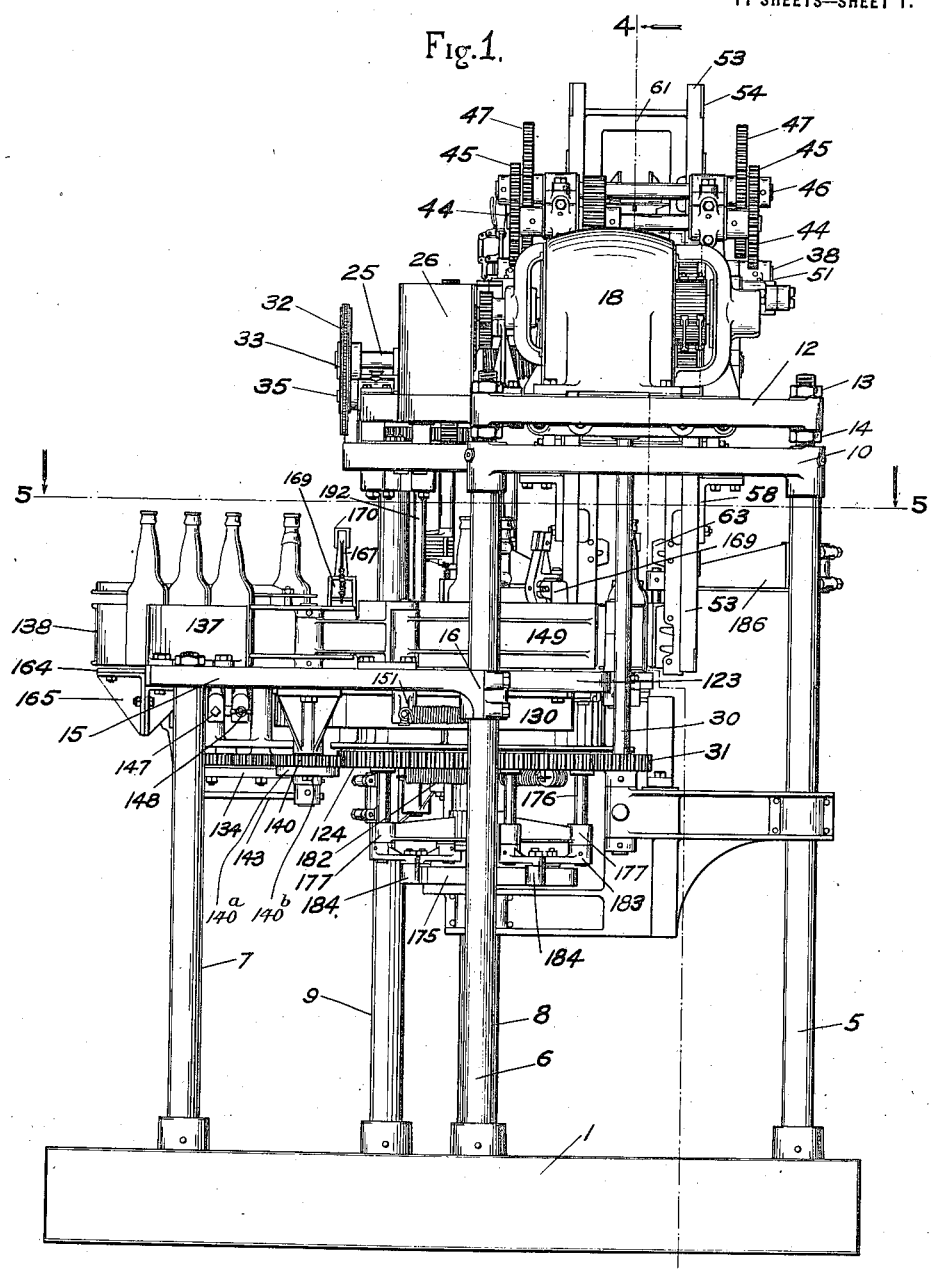
Figure 1 is a front elevation of the complete machine.

The entire machine is mounted upon a suitable base 1 from which rises a number of supporting columns 2, 3, 4, 5, 6, 7, 8 and 9, the columns 3, 4, 5, 6, 8 and 9 are shouldered at their upper ends and there support a tie plate or supporting plate 10, the supporting plate 10 being clamped to the columns by means of the set screws 11. The columns 4, 5, 6, and 8 extend through and above the tie plate 10, and are threaded at their upper ends where they carry a secondary foundation plate 12, which is adjustable vertically by means of the nuts 13 and 14. This plate 12 carries the driving motor and the chain drive mechanism for the picker chains and the adjustment is for the purpose of adjusting the slack of the chains without necessitating either a derangement of the chain drive mechanism which is mounted as a unit on the plate 12, or any movement of the lower picker chain sprockets which require a definite adjustment with reference to the revolving table. The columns 2 and 7 support and terminate in a supporting plate 15, for the feed and discharge mechanism, this plate being also clamped at 16 to the column 6 and at 17 to the column 9, so that it is amply supported at the proper height.

Figure 2:
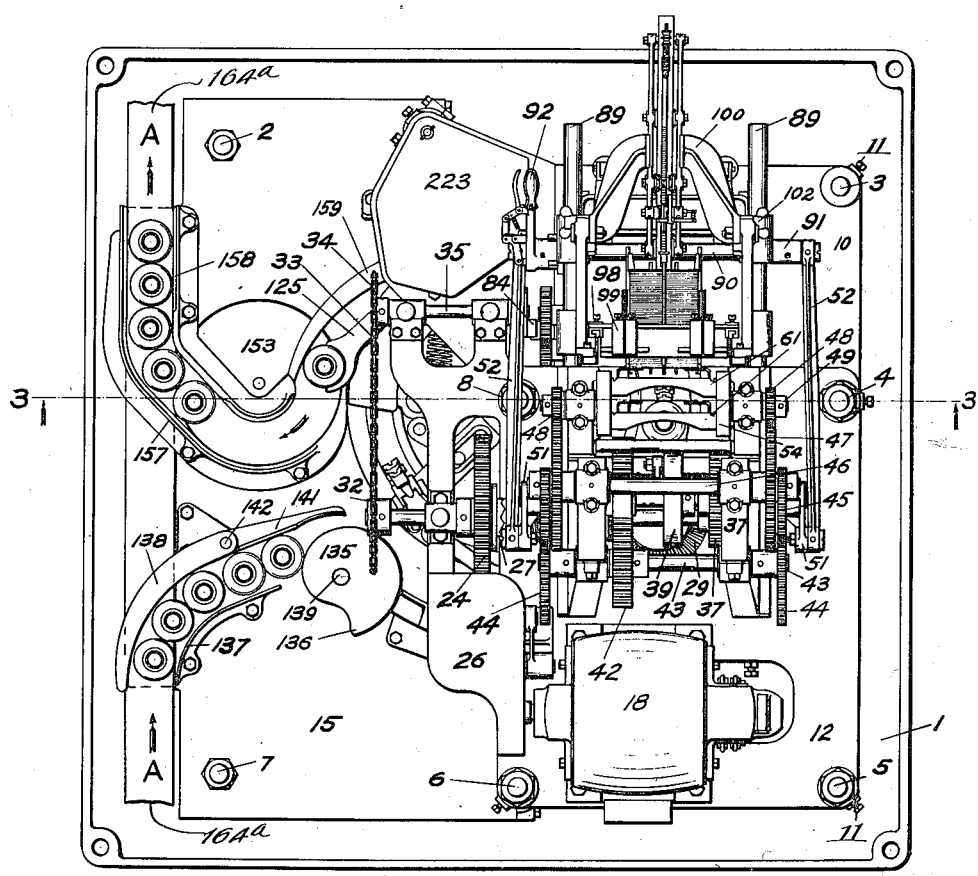
Fig. 2 is a plan view thereof.

As has been suggested the principal drive mechanism of the device is mounted upon and supported by the vertically adjustable plate 12. Power is furnished preferably by an electric motor 18 mounted on this plate, and this motor drives through a train of gears 19, 20, 21, 22, 23 and 24, a transverse horizontal shaft 25 which is the main drive shaft of the machine. A gear shield 26 is preferably provided to inclose and protect this gear train. The gear 24 is not fast upon the shaft 25 but is connected thereto by a slip clutch 27 of any well known form, so that in the event the motion of the machine is impeded the clutch will slip and relieve the motor from undue strain. The shaft 25 carries a bevel gear 28 meshing with a companion bevel gear 29 which is splined on a vertical shaft 30, the lower end of which is fast to pinion 31, Fig. 4. This pinion 31 is the drive pinion for the rotating table. The shaft 25 also carries a sprocket 32 which by means of a chain 33 and companion sprocket 34 drives a shaft 35, Fig. 2, which is the drive shaft for the glue feed rollers. The shaft 25 also carries a spur gear 36 which meshes with a companion gear 37 on the transverse shaft 38. This shaft 38 carries a cam 39 having a groove in its side face engaged by a roller upon the end of lever 40, whose other end is connected, as will be later described, to the glue box and serves to bring it into and out of active relation with the glue rolls at the proper times. The shaft 38 also carries a mutilated gear 41, which, together with a companion mutilated gear 42, forms a Geneva stop mechanism. The gear 42 is mounted on a shaft 43, and the gears 41 and 42 are so designed that for one quarter of a revolution of the shaft 38 the gear 42 will stand at rest and that for the next three-quarters of a revolution of the shaft 38 the shaft 43 will be caused to make one complete revolution. This device is provided to give the necessary dwell to the picker frame during the intervals at which one frame is receiving its labels from the label magazine and the other frame is depositing its labels upon the bottle. The shaft 43 carries two elliptic gears 44 which mesh with companion elliptic gears 45 upon the parallel shaft 46. This shaft 46 carries spur gears 47 which mesh with spur pinions 48 on the stub shafts 49. These shafts 49 carry at their other ends the sprockets 50 for the picker chains. The purpose of the elliptic gear drive is to secure a gradual stopping and starting of the drive sprockets 50 together with the high maximum velocity at mid stroke, this being found essential to a proper handling of the labels and the avoidance of unnecessary shock and jar.

The shaft 38 also carries a pair of parallel cranks 51 to which are connected the pitmen 52, Fig. 11, by which reciprocating motion is imparted to the label magazine to move it into and out of contact with the picker frames. It should be noted that the motor, all gear trains, the drive gear 29, the chain sprocket 50 as well as the label magazine are mounted on the foundation plate 12 and move with it as a unit when the same is adjusted.

Figure 3:
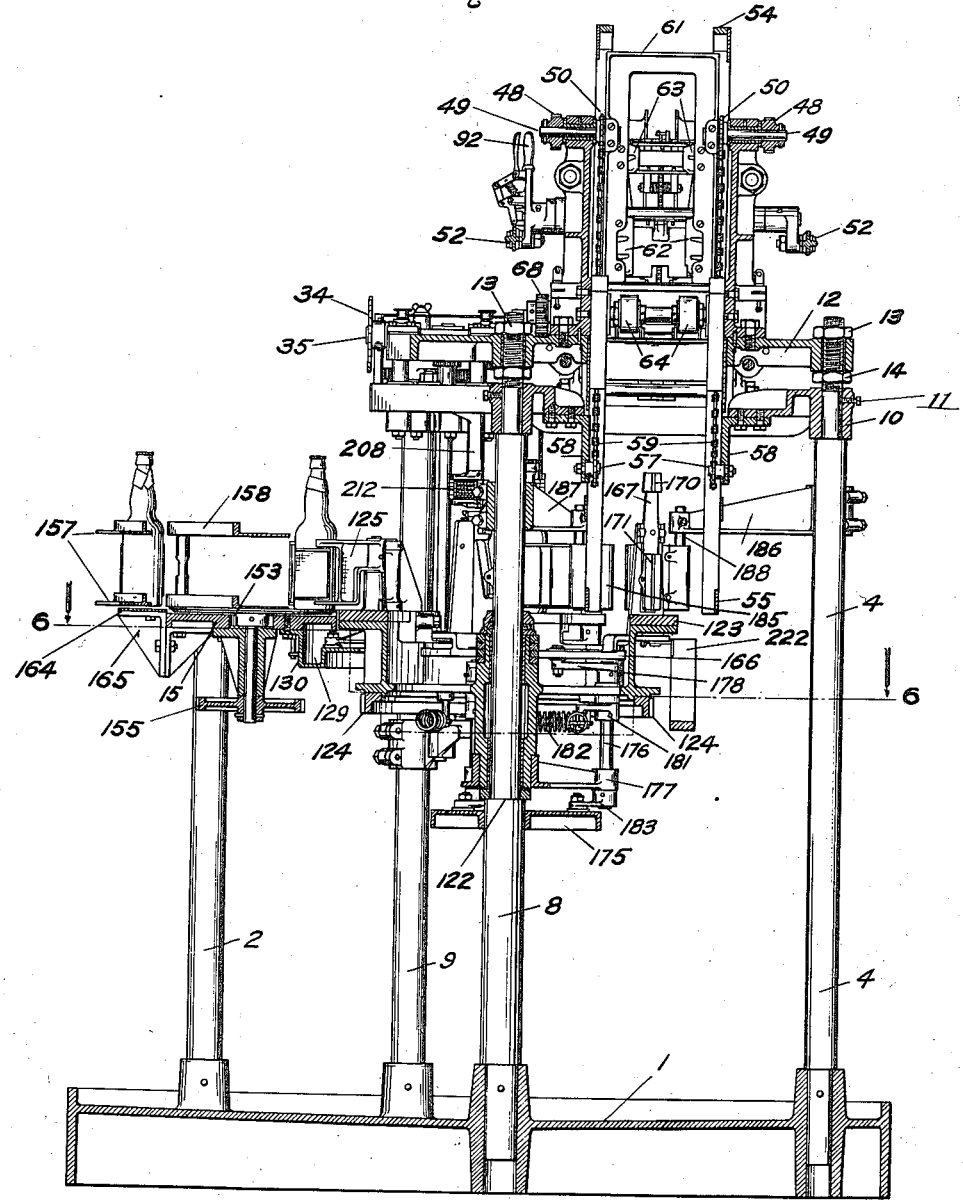
Fig. 3 is a section on the line 3—3 of Fig. 2.

The picker frame guides, two in number, are also mounted upon the plate 12 and are adjusted therewith. Each guide consists of two vertical members 53 tied together at the top by a cross piece 54 and at the bottom by a cross piece 55. A middle guide 56 having tapering ends is provided intermediate the members 53, Fig. 4, of each guide. The picker frame guides extend above the plate 12 to a point somewhat higher than the sprocket 50 and below the plate 12 nearly into contact with the rotating table. The two guides are spaced apart to permit the passage of a bottle between them. The lower sprockets 57, Fig. 3, are mounted to turn freely on brackets 58 which in turn are bolted to the plate 10. Consequently the picker feed chains 59 are adjusted in tension by the vertical adjustment of the plate 12, and this action is effected without deranging any of the gear trains carried on plate 12 and without affecting the position of the sprockets 57 which should be fixed with reference to bottles carried by the revolving table. As gear 29 is splined on its shaft the table drive is not deranged. The picker frames, two in number, are mounted on trunnions 60 carried by the chains 59, and each consists of an inverted U-shaped frame 61 provided with picker plates 62 at each side for the body labels and with similar picker plates 63 above the picker plates 62 for the neck labels. These picker plates are mounted with sufficient intervening space to permit the passage of a bottle between them.

The various parts are so arranged that as the motor 18 runs, the picker frames will move from their upper position to their lower position and vice versa, the movement taking place during three-quarters of a revolution of the shaft 38 with a dwell at either extreme position lasting for one-quarter of a revolution of the shaft 38. The picker frames are shown in the drawings in the position which they assume during the aforesaid dwell. It is to be noted that the picker frames when in their upper position rest with the trunnions 60 against the sprocket 50 and with the lower end of the frame bearing against guide 56 so that they are properly supported to withstand the pressure exerted upon them during the application of the labels from the magazines.

Figure 4:
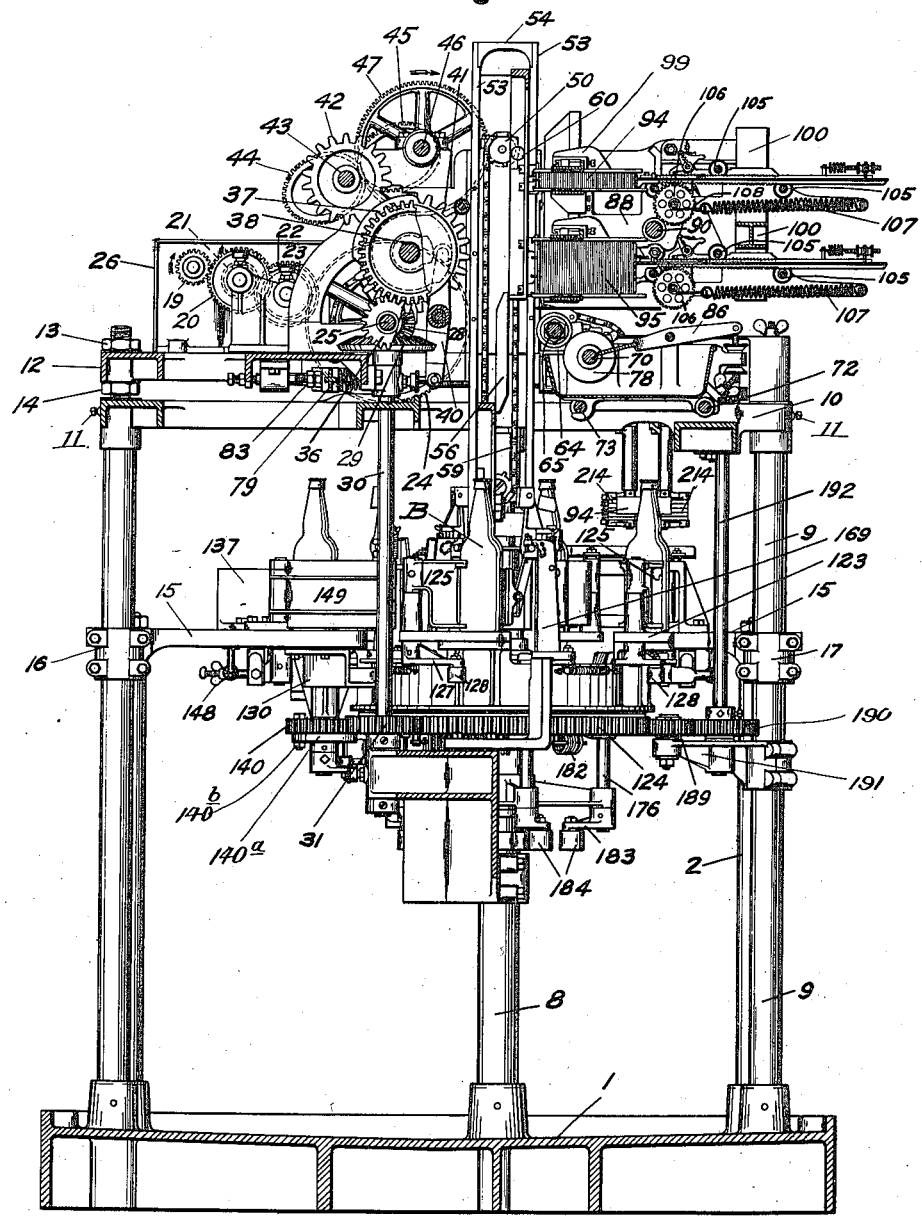
Fig. 4 is a section on the line 4—4 of Fig. 1.
Figure 27:
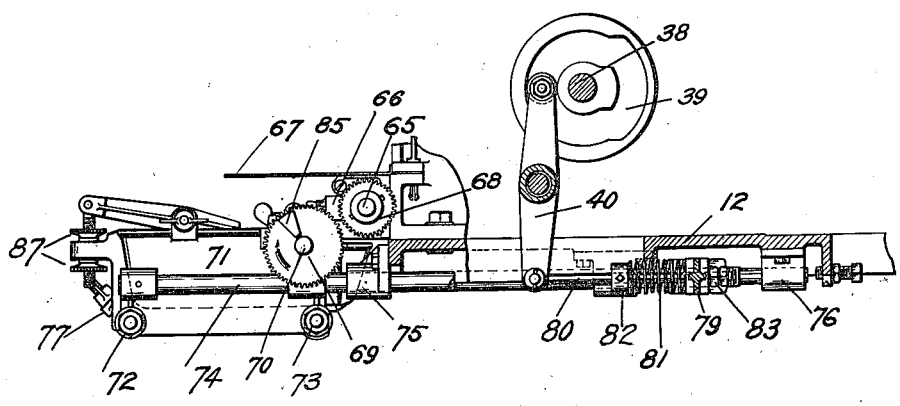
Fig. 27 is an elevation, partly sectional, of the mechanism for reciprocating the glue box.

As each picker frame moves upward it follows the right hand run of chain 59 as viewed in Fig. 4 and the picker plates 62 and 63 are drawn across the glue feed rollers 64 which stand in the path of the picker plates and impart a coating of glue thereto. The rollers 64 are mounted on a shaft 65 which turns in bearings 66 rigidly mounted on the base plate 12. A guard plate 67 protects the rollers from labels which might fall upon them from above. The shaft 65 is provided at one end with a gear 68 with which a gear 69 is adapted to mesh intermittently, the gear 69 being connected to a shaft 70 which is mounted in bearings in the glue pot 71. The glue pot 71 is provided with lugs which engage cross bars 72 and 73 which connect the two longitudinal slide bars 74, and these bars are guided for longitudinal reciprocation by means of guideways 75 and 76 bolted to the lower side of plate 12 (see Fig. 27). The pot 71 is held in position by means of a pivoted bolt and wing nut 77, so as to be readily removable for cleaning. The shaft 70 carries within the pot 71 a pair of feed rollers 78 (see Fig. 4), which are adapted to contact with, and feed glue to, the rollers 64, when the glue pot is moved toward its rollers or to the right as viewed in Fig. 27. Such movement is effected by means of the cam 39 acting through the lever 40. In order to provide for a failure of the gears 68 and 69 to mesh, a resilient connection is provided between the lever 40 and the bars 74. This consists of a cross bar 79 rigidly fastened to the bars 74, a link 80 connected to the lever 40 and passing through an aperture in the cross bar 79, a compression spring 81, a collar 82 and the nuts 83 on the link 80. In this way the bars 74 and their connected glue pot, gear and feed rollers are moved positively away from the rollers 64, but are moved impositively in the reverse direction due to the interposition of the spring 81. The gear 69 is constantly driven from shaft 35 already described by means of an eccentric lug 84 carried on the end of said shaft which engages a corresponding eccentric lug 85 formed on the gear 69. This connection is such as to permit the reciprocation of the gear 69 without deranging its drive from the shaft 35. The quantity of glue fed by the rollers 78 is determined by an adjustable pivoted scraper 86, whose position is set by means of the thumb screws 87.

The cam 39 is so arranged that during the period of motion of the picker frames the rollers 78 will be retracted from the rollers 64 permitting the latter to rotate under the influence of the upwardly moving picker frame, while during the period of rest of the picker frames, at which time they are both out of contact with the rollers 64, the glue feed mechanism will be moved inwardly to drive the rollers 64 and supply the same with the requisite quantity of glue. In this way the rollers 64 are always provided with the necessary amount of glue to supply the picker plates so that when these arrive in their proper position of rest they will be ready to receive labels from the label feed mechanism.

This label feed mechanism is constructed in duplicate consisting of two substantially identical mechanisms, one positioned to feed body labels and the other to feed neck labels to corresponding picker plates on the picker frames. The entire feed mechanism is mounted in a reciprocating frame 88 which is mounted to reciprocate upon two horizontal bar guides 89 carried on the plate 12, and is driven back and forth by means of the pitmen 52 which are attached to the frame 88 by means of a shifting fulcrum provided to enable the throwing of the label feed mechanism out of action without stopping the remainder of the machine. This shifting fulcrum device consists of a transverse shaft 90 (Figs. 2, 4, 11 and 12) turning in the frame 88 and having cranks 91 at its ends. The connecting rods 52 are connected to the extremities of these cranks. A hand lever 92 having a suitable latch 93 is provided to swing and latch the cranks 91 either in the position of Fig. 11 which is the operative position or in the position of Fig. 12 which is the inoperative position, in which the frame 88 is thrown back far enough not to enter into operative relation with picker frame 61. The frame 88 is of the form shown in the drawings and is such as adjustably to support two label magazines for the neck labels 94 and the body labels 95.

These magazines consist of a plurality of brass guide bars 96 held by yokes 99 (Figs. 2 and 4) and having inturned hook portions 97 at their ends. A pack of several thousand labels is supported and guided by the bars 96 to feed them face-wise toward the picker plates 62 and 63 as will be obvious. The guide frames are adjustable to receive labels of different proportions, and this result is effected by making adjustable clamp connections 98 between the frame 88 and the yokes 99 in which are mounted the guide bars 96, (see Fig. 2). The followers which feed the labels forward are carried in a frame 100 which is hinged at 101 to the frame 88. This is held in its downward or operative position by wing nuts 102, (see Figs. 11 and 12), and may, when these nuts are released, be swung into the upward position shown in Fig. 12 to permit the insertion of new packs of labels. The follower devices proper, act against follower plates 103 which are provided to distribute pressure over the entire surface of the labels. The follower devices are in duplicate and a description of one will suffice.

A normal-tension bar 104 which is T-shaped in cross section, is guided by means of rollers 105 to move in the line of feed of the labels. The depending flange of the bar 104 is provided with rack teeth which mesh with a feed gear 106 journaled in a portion of frame 100. The gear 106 is urged to rotate by a long helical spring 107 to which is attached a pair of tapes 108 wound around the shaft upon which gear 106 is mounted, on either side of said gear. This device due to the use of a relatively long spring serves to exert a constant tension or feeding pressure upon the labels. A secondary tension device comprises a ratchet bar 109 mounted on top of the bar 104 and capable of a longitudinal movement with reference thereto, whose extent is limited by means of the stops 110 and 111. This ratchet bar is drawn away from the follower plate 103 by means of a spring 112 whose tension is adjusted by means of a threaded rod 113 and the thumb nuts 114. A pair of pawls 115 and 116 of slightly different lengths are mounted upon a stud 118 carried by the frame 100. The pawl 116 is made with a rearward extension forming the hold-out pawl 117 and the two pawls 116 and 117 are held alternatively in two positions (see Figs. 15 and 16) by a spring 119. The pawl 115 is urged in its engaging direction by a spring 121 extending between it and the pawl 116. When thrown into the position of Fig. 16 the pawl 117 engages the hold-out stop 120 carried by rack 104. This arrangement is used to hold the follower mechanism in inactive position while renewing the label pack. When thrown to the position of Fig. 15 the pawls 115 and 116 engage the ratchet bar 109. The pawls 115 and 116 are of different lengths to secure fineness of adjustment without unduly small ratchet teeth on the bar 109, and the travel of the ratchet bar is so adjusted that as the frame 88 is drawn inward bringing the pack of labels into contact with its corresponding picker plate 62 or 63, the pawls 115 and 116 by their engagement with the ratchet bar 109 will move the same forward sufficiently to exert an additional or supplemental pressure upon the label pack through spring 112 and bar 104. This pressure serves to cause the foremost labels to adhere tightly to the picker plate and then be drawn off thereby as the frame 88 moves back. It should here be noted that the face of the picker plates 62 and 63 are cut away at their edges to permit the passage of the hook portions 87 of the guide bars 96.

By the mechanism set forth the labels are fed forward under a constant tension which is augmented in a determinate degree at the time of contact with the picker plates. By varying the tension of the spring 112 the degree of this augmented pressure may be adjusted. The form of the frames 88 and 100 is shown with sufficient clearness in the drawings, the essential requirements being that they shall properly guide and support the parts enumerated.

Figure 9:
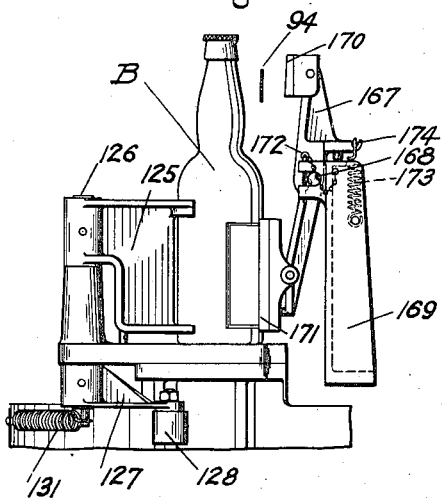
Figs. 9 and 10 are fragmentary elevations on an enlarged scale, showing two successive positions of the bottle clamp, bottle and label holders.
Figure 10:
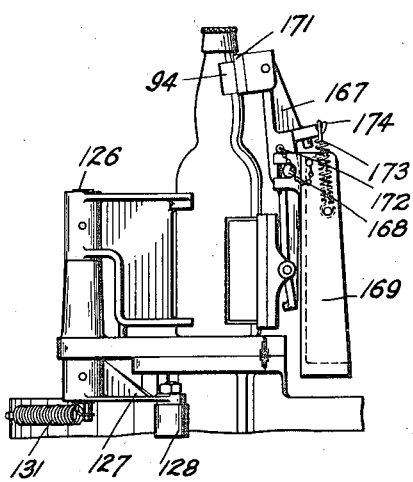
Figure 17:
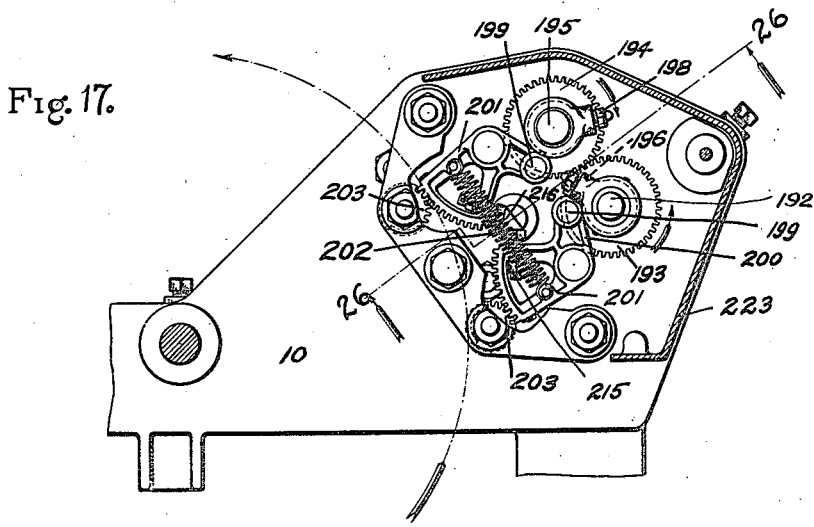
Fig. 17 is an enlarged plan view of the actuating mechanism for the neck wipers.

Bearing against the shoulder 122, (see Fig. 3), on the column 8 and turning on said column is the rotating table 123 which carries the bottles past the various labeling devices. The top of this table is flush with feed and discharge table 15. The table 123 carries a gear 124 engaged by gear 31 to drive the table. Mounted on vertical axes above the table rim are a series of bottle clamps or pushing rests 125, of the form best shown in Figs. 9 and 10. In the drawings four such clamps are shown upon the table 123, each clamp consisting of a forked member fast upon a vertical shaft 126 which extends downward through the table and terminates in a crank 127 having a roller 128. The roller 128 engages and coacts with a groove 129 in a cam plate 130 which is bolted to the under side of the feed and discharge table 15. When the rollers 128 are clear of the groove 129 the bottle clamps 125 are held in their inward positions by the springs 131 provided for that purpose (see Figs. 9 and 10). The purpose of mounting the clamps 125 to swing in and out is that the clamp may be moved outward into receiving relation with the feed device to engage and guide onto the table a bottle, hold the same during the action of the label holders and then after the bottle has nearly completed the circuit on the table to move it outward onto a discharge device so that it is carried free of the rotating table. Throughout the operation of affixing the label the bottle holder 125 is in its inmost postion, the holder 125 swinging outward to discharge a bottle and receive a new one, and then swinging into position the new bottle for the label operation.

The feed device receives its power from the rotating table through the gears 132 and 133 which are journaled between the receiving plate 15 and the supporting yoke plate 134. The feeding device consists of a rotating member 135 of a height substantially equal to the height of the body of the bottle and is provided with a finger 136 adapted to engage a bottle standing in the raceway formed by the guides 137 and 138 and of a bottle-clamp 125. This rotating feed member 135 is carried on the upper end of a shaft 139 which extends down through the table 15 and is provided at its lower end with a gear wheel 140 which is adjustably mounted on the shaft 139. Thus, the gear may be connected to a plate 140$^a$ splined to the shaft through the medium of machine screws 140$^b$, see Figs. 1 and 6, the screws being omitted in the latter figure. Consequently as the table is rotated it rotates the feed member 135, this member making one revolution for each bottle clamp on the table. The finger 136 is so positioned by an adjustment of gear 140 on shaft 139 as to engage a bottle and deliver it directly to the approaching bottle clamp 125. In order to prevent the bottles which are forced into the entrance race-way from breaking the guide 138 is provided with a hinged extension 141 mounted fast upon a shaft 142 which extends downward through the table 15 and terminates in the horizontal lever portion 143 coacting with the cam or camroll 144 on shaft 139. The lever 143 is held against the cam 144 by means of a spring 145 attached to the arm 146. The movement of the lever toward the shaft 139 is limited by an adjustable stop 147 and the tension of the spring 145 is adjusted by means of the thumb nut 148. The adjustment of the tension of the spring is made to correspond with the pressure of feed of the bottles into the race-way between guides 137 and 138, the bottles commonly being fed by a belt conveyer moving in the direction of the arrows A—A, Fig. 2. The angular position of the arm 141 and lever 148 is adjusted by a stop 147 according to the driving force exerted upon the bottles by the conveyer belt. The arrangement of the device is such that as the finger 136 grasps the foremost bottle the pivoted extension 141 is automatically swung away to permit the passage of this bottle and then swings back to prevent the succeeding bottle from crowding unduly upon the member 135. The member 135 is so proportioned that a bottle fed by it is moved at the same lineal speed as the approaching bottle clamp 125, so that the bottle is picked up by the clamp and moved upon the table without undue shock.

The moving of the bottle upon the table is effected by the conjoint action of the clamp 125 and the vertically pivoted inwardly extending guide finger 149 whose height is approximately the height of the body of the bottle. This guide finger 149 is fast on the vertical shaft 150 which extends downward through the table 15 (see Fig. 6) and is provided beneath the table with a spring held lever 151 adapted to swing the guide finger inward, and the adjustable stop 152 adapted to limit its inward movement. The purpose of the resilient mounting of the guide 149 is to accommodate bottles of irregular dimensions and to urge all the bottles tightly into the clamp 125.

Figure 5:
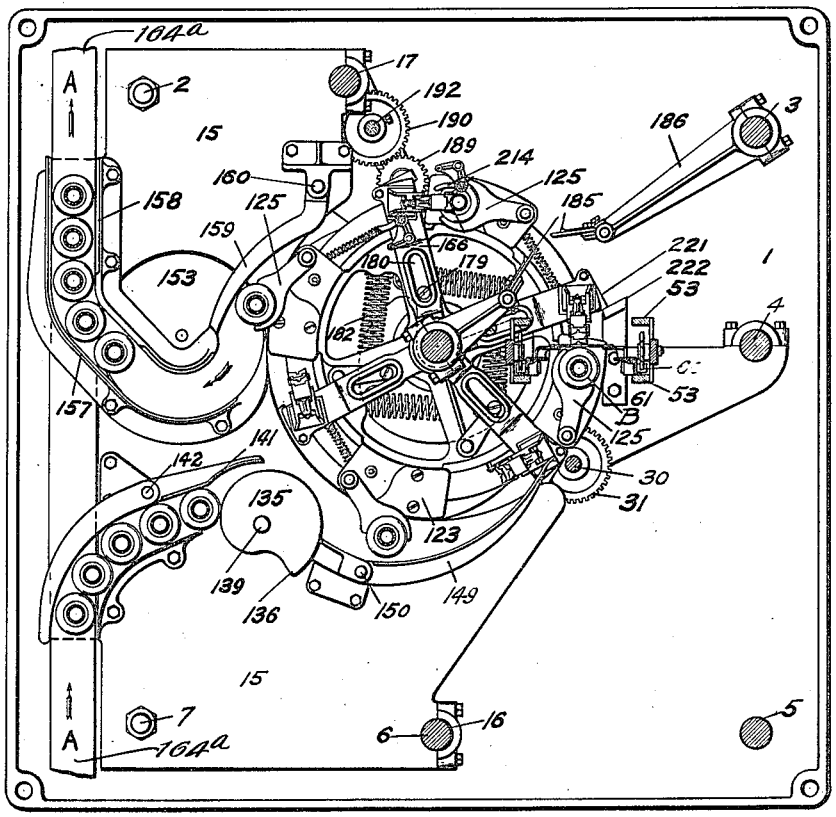
Fig. 5 is a section on the line 5—5 of Fig. 1.
Figure 6:
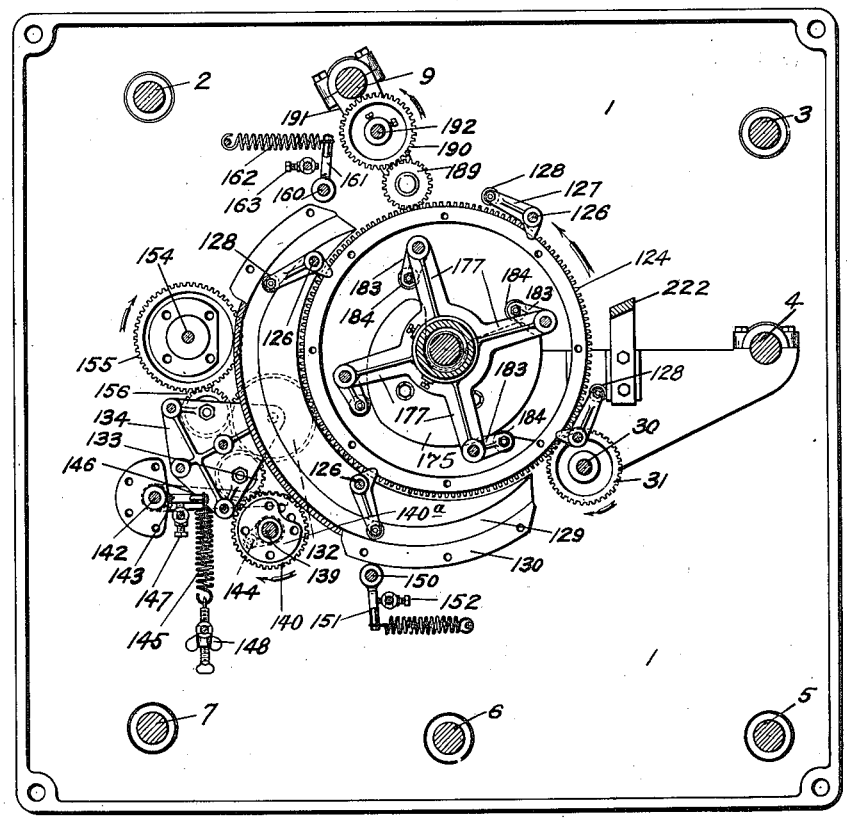
Fig. 6 is a section on the line 6—6 of Fig. 3.
Figure 7:
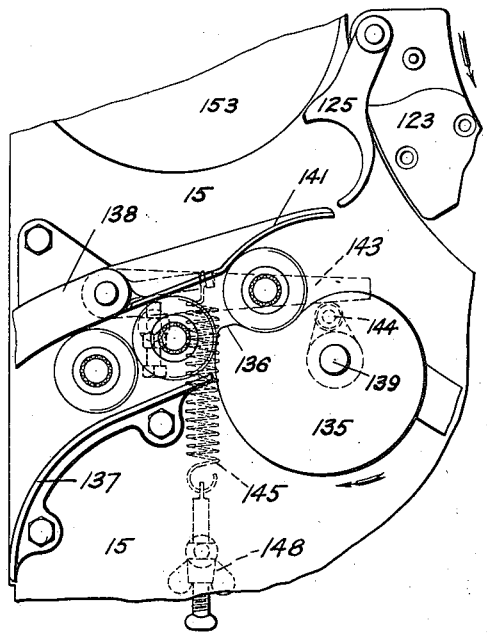
Figs. 7 and 8 are fragmentary views on an enlarged scale showing two successive positions of the intake feed and bottle clamp.
Figure 8:
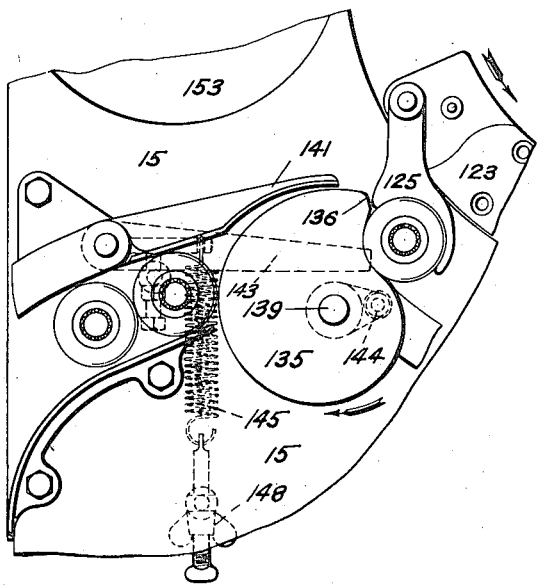

Neglecting for the present the devices which operate upon the bottles between the points of feed and discharge, the discharge mechanism will now be described. This consists of a horizontal disk 153 substantially flush with the top of the table 15, and consequently substantially flush with the top of the rotating table 123. This disk is fast on a shaft 154 which extends downward through the table 15 and terminates in the gear 155 driven through the idler 156 from the gear 132. The disk 153 rotates beneath the fixed discharge guides 157 and 158 which together form the discharge race-way. In order to hold the discharging bottles in engagement with the clamps 125 until they reach the disk 153, a vertically pivoted guide finger or plate 159 is provided. This is fixed on a vertical shaft 160 which extends downward through the table 15 and carries fast on its lower end a lever 161 which tends to swing the finger 159 inward by the action of spring 162. Such inward motion is limited by an adjustable stop 163 (see Fig. 6). The plate 159 serves to hold the bottle in engagement with clamp 125 until the bottle engages fixed guide 157 which carries it clear of the clamp 125 and onto the disk 153. The disk then feeds the bottle into the discharge race-way. The discharge race-way is preferably arranged to discharge upon a continuation of the feed conveyer running in the direction of the arrows A—A, so that a single conveyer may be used to supply and discharge bottles from the labeling machine. To effect this purpose the intake guide 138 and the discharge guide 157 extend outward beyond the edge of the table 15 to permit a conveyer belt 164ᵃ to pass beneath them so as to supply and discharge bottles to and from the labeling machine. In order to support the conveyer belt beneath the guides 138 and 157 a guide plate 164 is supported on brackets 165 at a level slightly below the top of table 15, there being sufficient clearance between the top of the table 164 and the guides 138 and 157 to permit the passage of the belt. Mounted on individual arms 166 which turn on a hub portion of the table 123 (see Fig. 5) are a series of label holders which consist of a clamp member 167 pivoted near its middle at 168 to an upstanding portion 169 of the arm 166. This member 167 is provided with a rubber faced neck label holder 170 at its upper extremity and a rubber faced body label holder 171 at its lower extremity. The pivot at 168 consists of a trunnion formed on the member 167 and held between lugs on the upstanding portion 169 by a removable pin 172. The member 167 is held in the position shown in Fig. 9 by means of a spring 173 connected to a rearwardly extending arm 174 and is forced to the position of Fig. 10 when the arm 166 swings against the bottle held by clamp 125. This movement is effected by a spring when a retaining lever over-travels the raised portion of the cam 175 fixed upon the upright 8. The arrangement of the mechanism for effecting this action is best shown in Figs. 3 and 5. Vertical shafts 176, one for each arm 166, are journaled in the table 123 and in a bearing yoke 177 attached thereto. Each shaft 176 carries at its upper end an arm 178 provided with a pin 179 which works in a slot 180 in the corresponding arm 166. A second arm 181 provides means for attaching a spring 182 which tends so to swing the shaft 176 as to move the arms 166 rearwardly with respect to the table 123. An arm 183 provided with a roller 184 bearing against the cam 175 (see Fig. 1) is the means provided for moving the arms 166 forwardly with reference to the table in opposition to the action of spring 182. As best shown in Fig. 6 the cam 175 decreases in its radius at such point as to cause the arm 166 and its corresponding label holder to move against the body of the bottle just as it reaches the point reached by the bottle marked "B" in Fig. 5. This point is the point at which the body of the bottle comes into initial contact with the body label held by the lower picker frame 61. The curvature of the cam is so designed that, as the bottle continues to move forward, the member 167 on the label holder arm will swing to bring the holding face 170 into contact with the neck of the bottle just as this reaches the neck label also held by the picker frame 61. The clamping faces 170 and 171 are now held snugly against the bottle by clamps 125 because of the action of the spring 182 and it will be noted that the holding faces 170 and 171 engage the labels at their middles so that their glued ends are drawn free of the picker plates as the bottle advances between the legs of the picker frame.

In order to prevent the arms 166 from swinging back too far and knocking or tearing the labels from the picker plates, the arms carry spring held pawls 221 which engage the adjustable fixed stop 222, carried by a portion of the frame.

As has already been described, shortly after the bottle has effected this stripping of the labels from the frame, this frame moves upward receiving a coating of glue in transit and comes to rest in a position to receive a new set of labels. The arm 166 remains in its rearward position with the clamping faces 170 and 171 holding the labels against the bottle until the bottle has been carried past the body and neck label wipers, after which the rollers 184 again engage the raised portion of the cam 175 causing the label holders to move forward away from the bottle just prior to its discharge onto the disk 153. It is to be noted that the arms 166 correspond in number to the label holders 125 and obviously each is mounted for individual motion and each is provided with an individual actuating mechanism coacting with the cam 175.

After the bottle has moved forward past the picker frame with the labels held against it by means of the label holders, it passes between two wipers consisting of rubber flaps 185 carried respectively on a bracket 186 adjustably mounted on the column 3, and a bracket 187 adjustably mounted on the column 8, the wiper strips being mounted on depending studs or bars 188 to permit the brackets 186 and 187 to clear the mechanism rotating with the table 123. These wipers 185 engage the body label and wipe its glued ends in contact with the bottle.

Figure 18:
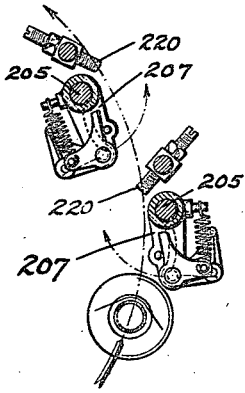
Figs. 18, 19 and 20 are sections on line 18—18 of Fig. 26, showing the successive positions of the neck wipers.
Figure 19:
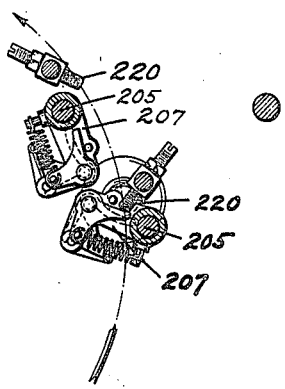
Figure 21:
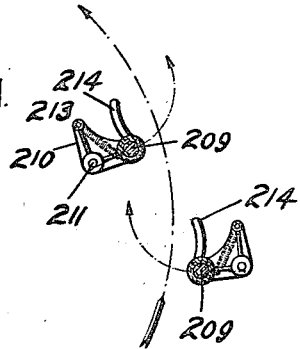
Fig. 21 is a sectional view on the plane of the line 21—21 of Fig. 22, showing the wipers in the same relative position as in Fig. 18.
Figure 20:
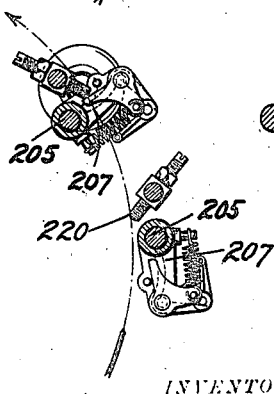
Figure 26:
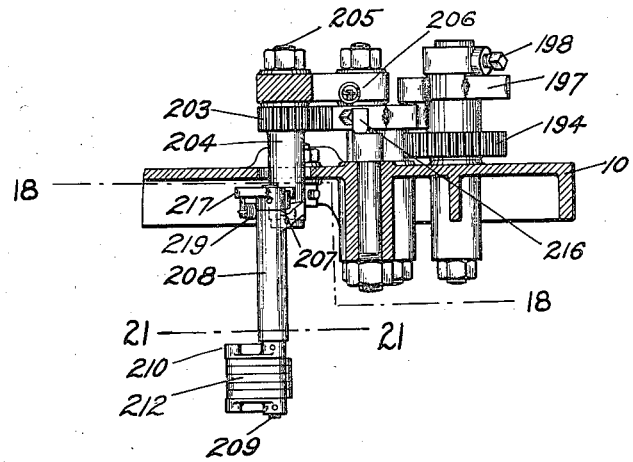
Fig. 26 is a section on the line 26—26 of Fig. 17.

If the ends of the neck label overlap on the rear side of the bottle the neck label wipers should act serially, and should be pivoted in such a way as to swing inward behind the neck of the bottle and wipe down the ends of the label. The neck wiper mechanism is mounted on the tie plate 10, the wipers proper depending from said plate. Figs. 17 to 26 illustrate this wiper mechanism in detail. The mechanism is driven from gear 124 on the table 123 by means of the gears 189 and 190 carried on the bracket 191 which is clamped on the column 9. Power is transmitted from the gear 190 by an upwardly extending shaft 192 which passes through the table 10 (see Fig. 17) and carries at its upper end a gear 193. The gear 193 meshes with a similar gear 194 turning freely on stud 195 and carried by each of the gears 193 and 194 are cams 196 and 197 which are adjusted relatively to the gears by means of the set screws 198 in order properly to time the wiping action. These cams coact with rollers 199 on the arms 200 which form parts of gear segments 201, substantially similar in form. These gear segments are drawn toward each other by a helical spring 20' and each gear meshes with a corresponding pinion 203. Consequently when the shaft 192 is driven the gears 203 are oscillated through the action of the cams and gear segments, and by adjusting the respective cams the time of the oscillation of the gears 203 can be timed to correspond to the time of passage of the bottle past corresponding wipers, it being understood as above stated that the wipers act serially and at different points in the bottle's path. The gears 203 are each formed with a depending sleeve 204 and turn on studs 205 fast in the bridge plate 206. At the lower end of each sleeve 204 is provided a crank offset 207 which carries at its extremity a second sleeve 208 (see Figs. 22 and 24). The wipers proper are fast on shafts 209 turning in corresponding sleeves 208 and consist of the triangular top and bottom plates 210 tied together by the shafts 209 and studs 211. Held between the plates 210 and fulcrumed on the shafts 209 are series of L-shaped wiper fingers. To the tails 212 of these are attached springs 213, the portion 214 being the wiper finger proper and being curved as shown. The rearward movement of the gear sectors 201 is limited by adjustable stops 215 which engage a stud 216 provided for that purpose. The shafts 209 extend upward through the sleeve 208 and have attached to their upper ends the bell cranks 217 one arm of each of which is held against a stop 218 by means of a spring 219. An adjustable stop 220 carried by the plate 10 is adapted to engage the arms of the bell cranks 217 as the arm 207 swings toward the limit of its motion, thus swinging the bell cranks 217 backward and moving the wiper fingers out of contact with the bottle neck. As the bottle passes the wipers these successively swing toward and behind its neck, the result being that the ends of the labels are successively wrapped or wiped around back of the bottle neck. Successive positions of the wipers are shown in Figs. 18, 19 and 20. The adjustment of the stop 220 determines the point at which the wiping action ceases and at which the wiper fingers are drawn away from the bottle neck to permit it to pass onward unobstructed. A plurality of wiper fingers 214 permits the wiper to conform to any special curvature of the bottle neck. The wiper gearing is covered by case 223.

The proper relation of the various drives will be obvious, but it seems well to state that where, as in this case, the table has four bottle clamps the gear ratios are so designed that the table makes one revolution for four revolutions of the shaft 38; that the neck wiper drive shaft 192 makes one revolution for each revolution of the shaft 38. The label mechanism and the glue feeding mechanism move through their operative cycles for each revolution of the shaft 38, and the same is true of the feeding-in member 135. As the picker frames are in duplicate each frame completes its cycle in two revolutions of the shaft 38.

Consequently for each bottle fed into the machine provision is made for gluing and feeding a label to the bottle, clamping the same thereto, wiping the body label, wiping the neck label and discharging the labeled bottle from the machine. The relative timing of the various portions is readily worked out either from the drawings or by trial. Although such adjustments are not described in detail the various parts are made capable of adjustment where necessary so as to accommodate the adjustment of the table 12 and slight adjustment of timing essential to a successful operation of the device. It is believed that the operation of the device will be sufficiently clear from the description so far given.

Having thus described my invention, what I claim is:—

1. In a labeling machine for bottles and the like, the combination of a suitable supporting frame; a table mounted to rotate upon a substantially vertical axis therein; means for rotating said table continuously; a bottle clamp mounted on said rotating table and adapted to clamp a bottle thereon in an upright position; a feed mechanism supported by said frame and adapted to insert bottles into said clamp as the table rotates; a mechanism carried by said frame and adapted to apply labels to bottles carried on said table; and a discharge device adapted to receive bottles from said clamp and to discharge them from the machine.

2. In a labeling machine for bottles and the like, the combination of a suitable supporting frame; a table mounted to rotate upon a substantially vertical axis therein; means for rotating said table continuously; a bottle clamp carried by said table and adapted to clamp a bottle in an upright position thereon; a feed mechanism supported by said frame and adapted to insert bottles into said clamp; mechanism for applying adhesive to a label and positioning it in the path of a bottle carried by the table; a holding device turning with the table and adapted to hold said label against the bottle; suitable wipers; and a discharge device adapted to receive bottles from said clamp and discharge them from the machine.

3. In a labeling machine for bottles and the like, the combination of a suitable supporting frame; a table mounted to rotate upon a substantially vertical axis therein; means for rotating said table continuously; a bottle clamp carried by said table and adapted to clamp a bottle in an upright position thereon; a feed mechanism carried by said frame and adapted to insert bottles into said clamp; a picker frame adapted in one position to hold a label in the path of a bottle carried by the table; mechanism for supplying adhesive and labels to the picker frame when in another position; means for moving the picker frame alternately between the two positions aforesaid; a holding device turning with the table and adapted to clamp to the bottle a label held by the picker frame and to assist in stripping it from the latter; suitable wipers; and a discharge mechanism adapted to receive bottles from said bottle clamp.

4. In a labeling machine for bottles and the like, the combination of a suitable supporting frame; a table mounted to rotate upon a substantially vertical axis therein; means for rotating said table continuously; a bottle clamp carried by said table and adapted to clamp a bottle in an upright position thereon; a feed mechanism carried by said frame and adapted to insert bottles into said clamp; a picker frame adapted in one position to hold neck and body labels in the path of bottles carried by the table; mechanism for supplying adhesive and labels to the picker frame when in another position; means for moving the picker frame alternately between the two positions aforesaid; a holding mechanism rotating with the table and adapted to hold to the bottles labels positioned by the picker frame and to assist in stripping them from the picker frame; suitable wipers for the body labels; a pair of swinging, serially actuated neck label wipers; and a discharge mechanism adapted to receive bottles from the bottle clamp.

5. In a labeling machine for bottles and the like, the combination of a suitable supporting frame; a table mounted to rotate upon a substantially vertical axis therein; means for rotating said table continuously; a bottle clamp carried by said table and adapted to clamp a bottle in an upright position thereon; a feed mechanism carried by said frame and adapted to insert bottles into said clamp; a picker frame adapted to position labels in the path of bottles carried by the table; means for supplying adhesive and labels to the picker frame; a label holder arm adapted to rotate with the table but capable of a limited rotary motion relatively thereto to move into and out of label holding relation with a bottle; a cam mechanism actuated by the rotation of the table and adapted to produce such relatively movement of the label holder arm; suitable wipers; and a discharge mechanism adapted to receive bottles from the bottle holders.

6. The combination with suitable label affixing apparatus; of a bottle carrier mechanism adapted to move bottles into operative relation with the affixing apparatus and comprising a table mounted to rotate upon a substantially vertical axis;

means for continuously rotating the table; a bottle clamp carried by the table; a feed mechanism adapted to insert bottles into said clamp; and a discharge mechanism adapted to receive bottles from said clamp.

7. The combination with suitable label affixing apparatus, of a bottle carrier adapted to move bottles into operative relation with said apparatus, comprising a table mounted to rotate upon a substantially vertical axis, means for continuously rotating the table, a bottle clamp mounted upon a vertical axis on the table, a cam mechanism actuated by the rotation of the table and adapted to swing the bottle clamp approximately radially out and back during one part of the rotation of the table, a rotating feed member having a feeding finger adapted to engage a bottle and insert it into the bottle clamp as the clamp begins its return movement, and a rotating disk adapted to engage and discharge a bottle as the same is moved outward by the movement of the bottle clamp.

8. The combination with suitable label affixing apparatus, of a bottle carrier mechanism adapted to move bottles into operative relation with said apparatus and comprising a table mounted to rotate upon a substantially vertical axis, means for continuously rotating the table, a bottle clamp mounted on a vertical axis on the table, a mechanism actuated by the rotation of the table and adapted to swing the bottle clamp away from and then toward the center of the table during a part of its rotation, a discharge disk adapted to engage and discharge the bottle moved outward from the table by the outward movement of the clamp, a rotating feed drum having a feeding finger adapted to engage a bottle and feed it into the bottle clamp as the latter moves inward upon the table, and a cam actuated gate adapted to open to permit the passage of such bottle and to close to prevent the passage of succeeding bottles, until engaged by the feeding finger.

9. In combination with suitable label supplying and wiping devices, a bottle carrier mechanism adapted to move bottles into operative relation with said supplying and wiping devices and comprising a table mounted to rotate upon a substantially vertical axis, means for continuously rotating the table, a bottle clamp mounted on the table to move toward and from the center thereof, a feed mechanism adapted to insert bottles into said clamp when the latter is moved outward; a discharge mechanism adapted to receive bottles from said clamp when the latter is moved outward; a label holding arm adapted to rotate with the table but capable of a limited rotative motion relative thereto at points intermediate the feed and discharge devices; and a mechanism actuated by the rotation of the table and adapted to effect such relative movement of the label holding arm to cause it to enter into holding relation with a bottle held by the clamp when in its inward position.

10. The combination of a table mounted to rotate upon a substantially vertical axis, of means for rotating the table; a bottle clamp movable toward and from the center of the table to move bottles onto and off of the table; a label holding arm mounted to rotate with the table and have a limited movement relative thereto to move into and out of clamping relation with a bottle held thereon by the bottle clamp; and mechanisms actuated by the rotation of the table adapted so to move the bottle clamp and the label holding arm.

11. The combination with mechanism for continuously moving a bottle, of a device adapted to apply adhesive to neck and body labels and to position them in the path of the bottle; a label holding device adapted to enter into clamping relation with the bottle and labels, as the former reaches the latter; suitable wiping mechanism for the body label; and a pair of serially acting mechanically actuated wipers for the neck label.

12. The combination of a rotating table; a bottle clamp carried thereby; an arm adapted to rotate with the table and capable of a limited rotative movement relatively thereto; a label holder carried by said arm; a fixed cam; and a lever mechanism carried by the table, connected with the arm and coacting with the cam to move the label holder into and out of clamping relation with a bottle held by the bottle clamp.

13. The combination of a rotating table; a bottle clamp carried thereby; an arm adapted to rotate with the table and capable of a limited rotative movement relatively thereto; a label holder carried by said arm; a fixed cam; a lever mechanism carried by the table, connected with the arm and coacting with the cam to move the label holder into and out of clamping relation with a bottle held by the bottle clamp; and a ratchet stop mechanism independent of the table and adapted to prevent the rearward overtravel of the arm.

14. The combination with suitable bottle feed, label clamping and label wiping devices, of a reciprocating picker frame provided with picker plates and adapted to move between a label receiving and a label affixing position; an intermittent variable speed drive mechanism adapted to move the picker frame between said positions; means for applying adhesive to the picker plates as the frame moves to label receiving position; and a label feed mechanism adapted to deposit a label on the picker plates when the frame is in label receiving position.

15. The combination with suitable bottle feed, label clamping and label wiping devices, of a reciprocating picker frame provided with picker plates and adapted to move between a label receiving and a label affixing position; an intermittent variable speed drive mechanism adapted to move the picker frame between said positions; means for applying adhesive to the picker plates as the frame moves to label receiving position; and a reciprocating label magazine adapted to press a label into adhesive contact with the picker plates when the picker frame is in receiving position and then to move away therefrom.

16. The combination with suitable bottle feed, label clamping and label wiping devices, of a reciprocating picker frame provided with picker plates and adapted to move between a label receiving and a label affixing position; an intermittent variable speed drive mechanism adapted to move the picker frame between said positions; means for applying adhesive to the picker plates as the frame moves to label receiving position; a label magazine mounted to move toward and from the label receiving position of the picker plates; a normal tension device adapted constantly to urge the labels forward in said magazine; a drive mechanism adapted to move the magazine; and a supplementary pressure device actuated by the magazine drive mechanism in its forward movement to press the foremost label in the magazine into adhesive contact with the picker plates.

17. The combination with suitable bottle feed, label clamping, and label wiping devices, of a picker frame mounted to reciprocate between a label receiving and a label delivering position; a drive train for the picker frame including a Geneva stop and elliptic gears and adapted to move said frame between said positions; and means for supplying adhesive and labels to the picker frame.

18. The combination with suitable bottle feed, label clamping and label wiping devices, of a picker frame mounted to move between a label receiving and a label delivering position; a drive mechanism for the picker frame including an intermittent drive device and a variable speed device; and means for supplying labels to the picker frame.

19. The combination with suitable bottle feed, label clamping and label wiping devices, of an inverted U-shaped picker frame adapted to straddle a bottle to be labeled and to move between label receiving and delivering positions; guides for the frame; a drive chain connected with the frame; an intermittent variable speed drive mechanism for the chain; rolls adapted to supply adhesive to the frame as it moves toward label receiving position; and a label feed adapted to deposit labels on the picker frame when in receiving position.

20. A label feed mechanism for labeling machines having picker plates, comprising in combination, suitable guides; a label magazine mounted to move on said guides to bring its contained labels into and out of contact with the picker plates; drive mechanism for so moving said magazine; a normal tension device adapted to exert a constant feeding tension on the labels in said magazine; and a supplementary tension device actuated by the forward movement of the magazine to press the labels into adhesive contact with the picker plates.

21. A label feed mechanism for labeling machines provided with picker plates and comprising in combination, suitable guides; a label magazine mounted to move on said guides forward toward and back away from the picker plates; drive mechanism for said magazine; a follower mechanism adapted to exert a constant feeding tension on labels in the magazine; and a supplementary tension device connected with the follower mechanism and actuated by the forward movement of the magazine to press the foremost label in the magazine into adhesive contact with the picker plates.

22. A label feed mechanism for labeling machines provided with picker plates and comprising in combination, suitable guides; a label magazine mounted to move on said guides forward toward and back away from the picker plates; drive mechanism for said magazine; a follower mechanism adapted to exert a constant feeding tension on labels in the magazine; a spring connected with the follower mechanism; and means actuated by the forward movement of the magazine to stress said spring to urge the foremost label into adhesive contact with the picker plates.

23. A label feed mechanism for labeling machines provided with picker plates and comprising in combination, suitable guides; a label magazine mounted to move on said guides forward toward and back away from the picker plates; drive mechanism for said magazine; a follower mechanism adapted to exert a constant feeding tension on labels in the magazine; a spring connected with the follower mechanism; means actuated by the forward movement of the magazine to stress said spring to urge the foremost label into adhesive contact with the picker plates; and means for adjusting the degree of such stressing of said spring.

24. A label feed mechanism for labeling machines provided with picker plates and comprising in combination, suitable guides; a label magazine mounted to move on said guides forward toward and back away from the picker plates; drive mechanism for said magazine; a follower mechanism adapted to exert a constant feeding tension on labels in the magazine; a member capable of limited motion relatively to the follower mechanism; ratchet connection between the magazine and said member; and a spring connected with said member and with the follower mechanism.

25. A label feed mechanism for labeling machines provided with picker plates and comprising in combination, suitable guides; a label magazine mounted to move on said guides forward toward and back away from the picker plates; drive mechanism for said magazine; a follower mechanism adapted to exert a constant feeding tension on labels in the magazine; a member capable of limited motion relatively to the follower mechanism; ratchet connection between the magazine and said member; a spring connected with said member and with the follower mechanism; and means for adjusting the tension of said spring.

26. A label feed mechanism for labeling machines provided with picker plates, and comprising in combination, suitable guides; a label magazine mounted to move on said guides toward and away from the picker plates; drive mechanism for said magazine; a spring urged follower adapted to exert a constant feeding tension on labels in the magazine; a ratchet bar capable of movement relative to the follower; a pawl carried by the magazine and coacting with the ratchet bar; and an adjustable spring connection between the ratchet bar and the follower.

27. The combination with a labeling machine having a reciprocating picker frame carrying picker plates, of a glue applying mechanism comprising, a glue roller mounted to contact with a passing picker plate and provided with a drive gear; a glue reservoir; a rotating glue feeder turning in the reservoir and provided with a gear adapted to mesh with the gear on the glue roller; means for driving the glue feeder; suitable guides for the glue reservoir; and means for reciprocating the reservoir on said guides to mesh and unmesh the gears and simultaneously to bring the glue feeder into and out of contact with the glue roller.

28. The combination with a labeling machine having a reciprocating picker frame carrying picker plates, of a glue applying mechanism comprising, a glue roller mounted to contact with a passing picker plate and provided with a drive gear; a glue reservoir; a rotating glue feeder turning in the reservoir and provided with a gear adapted to mesh with the gear on the glue roller; an adjustable scraper adapted to coact with the glue feeder to vary its rate of feeding; means for driving the glue feeder; suitable guides for the glue reservoir; and means for reciprocating the reservoir on said guides to mesh and unmesh the gears and simultaneously to bring the glue feeder into and out of contact with the glue roller.

29. In a wiping mechanism the combination of a crank shaped carrier mounted to swing toward and from a bottle to be wiped; a wiper-head pivotally supported at the extremity of said carrier; a resilient wiping face carried by the wiper-head; a spring adapted to urge the wiper-head into operative relation with a bottle; a fixed stop adapted to force the wiper-head out of such relation near the limit of movement of the wiper carrier toward the bottle; and means for actuating the carrier.

30. In a wiping mechanism the combination of a crank-shaped carrier mounted to swing toward and from a bottle to be wiped; a wiper head pivotally supported at the extremity of said carrier; a plurality of spring-held wiper fingers mounted in said wiper head; a spring urging said wiper head about its pivot into position to coact with said bottle; a fixed stop adapted to force the wiper head out of such position near the limit of movement of the carrier toward the bottle; and means for actuating the carrier.

31. In a wiping mechanism the combination of a crank-shaped carrier mounted to swing toward and from a bottle to be wiped; a wiper head pivotally supported at the extremity of said carrier; a plurality of spring-held wiper fingers mounted in said wiper head; a spring urging said wiper head about its pivot into position to coact with said bottle; a fixed stop adapted to force the wiper head out of such position near the limit of movement of the carrier toward the bottle; means for adjusting the position of the fixed stop; and means for actuating the carrier.

32. In a wiping mechanism the combination of a crank-shaped carrier mounted to swing toward and from a bottle to be wiped; a wiper-head pivotally supported at the extremity of said carrier; a resilient wiping face carried by the wiper-head; a spring adapted to urge the wiper-head into operative relation with a bottle; a fixed stop adapted to force the wiper-head out of such relation near the limit of movement of the wiper carrier toward the bottle; an actuating cam operatively connected to actuate the carrier; and means for adjusting said cam.

33. In a wiping mechanism the combination of a crank-shaped carrier mounted to swing toward and from a bottle to be wiped; a wiper head pivotally supported at the extremity of said carrier; a plurality of spring-held wiper fingers mounted in said wiper head; a spring urging said wiper head about its pivot into position to coact with said bottle; a fixed stop adapted to force the wiper head out of such position near the limit of movement of the carrier toward the bottle; an actuating cam operatively related to the carrier and means for adjusting said cam to vary the time of actuation.

34. In a wiping mechanism the combination of a crank-shaped carrier adapted to swing toward and from a bottle; a gear carried thereby; a bearing formed in the extremity of the carrier; a wiper head mounted to turn in said bearing; a plurality of wiper fingers resiliently mounted in the wiper head; a spring tending to turn the wiper head in its bearing to bring the fingers to a position of coaction with the bottle; a fixed stop adapted to force the wper head out of such position near the limit of motion of the carrier toward the bottle; a gear sector meshing with the gear on the carrier; and a cam and opposing spring coacting with said sector to swing the carrier toward and from the bottle.

35. The combination of a conveying device adapted to carry bottles along a predetermined path; means for supplying and clamping labels to the bottles; and a plurality of label wipers arranged to act upon bottles at successive points in their path and each comprising; a crank-shaped carrier; an actuating device adapted to swing the carrier toward and from the bottle path; a wiper head pivoted at the extremity of the carrier; a resilient wiper face carried by the wiper head; a spring tending to turn the wiper head on its pivot into operative position; and a fixed stop adapted to turn the wiper head into inoperative position near the end of the forward movement of the carrier.

36. The combination of a conveying device adapted to carry bottles along a predetermined path; means for supplying and clamping labels to the bottles; and a plurality of label wipers arranged to act upon bottles at successive points in their path and each comprising; a crank-shaped carrier; an actuating device adapted to swing the carrier toward and from the bottle path; a wiper head pivoted at the extremity of the carrier; a plurality of spring held wiper fingers carried by the wiper head; a spring tending to turn the wiper head on its pivot into operative position; a fixed stop adapted to turn the wiper head into inoperative position near the end of the forward movement of the carrier; and means for adjusting the position of said stop.

37. In a labeling machine, the combination with means for gluing, delivering and affixing labels, a continuously moving carrier provided with a series of supporting rests individually disposed at intervals thereon, for carrying bottles or the like, and a traveling conveyer for the supply of bottles; of a feeding-in mechanism for passing the bottles from the conveyer to said carrier, adapted to regulate the instant of feeding-in action to relatively correspond with positions of the supporting rests upon the continuously-moving carrier.

38. In a labeling machine, in combination with means for gluing, delivering and affixing labels; a rotatable carrier; a series of upright bottle-pushing rests carried thereon; label-gripping devices mounted in connection with the carrier to move toward and from said pushing rests; and means for automatically feeding bottles onto said carrier; of guides for directing bottles away from said carrier; a horizontal rotatable disk, said disk forming a portion of the bottom of the guide-way; means for rotating said carrier; and means for controlling said grip-devices.

39. In a mechanism of the character described, the combination with label-affixing means, a moving carrier for bottles or the like, a discharge-way comprising a traveling conveyer or belt, and a horizontal rotatable disk located between said moving carrier and conveyer; of an outwardly-curved guiding fender adjacent said disk.

40. In a machine of the class described, in combination, a rotary carrier provided with bottle-pushing means thereon, means for gluing and presenting labels, label-affixing devices, means for automatically feeding bottles to said carrier, and a delivering conveyer; of means for directing the bottles from said carrier to said delivering conveyer, consisting of curved guards or fenders.

41. In a labeling machine, in combination with means for wiping-on or affixing labels, a rotating carrier adapted to support and carry bottles or the like in a circular path, a label-supply-holder positioned out of the path of movement of said carrier, picker devices provided with pickers, that take labels from said label-supply and deliver the same to the bottles at a predetermined position in the path of the carrier, means for actuating or moving said picker devices back and forth, and means for securing a relative movement between said label-supply holder and the picker devices.

In testimony whereof I have signed my name to this specification in the presence of two subscribing witnesses.

OTTO EICK.

Witnesses:
HORACE A. DODGE,
PARKER DODGE.